Patented Dec. 12, 1922.

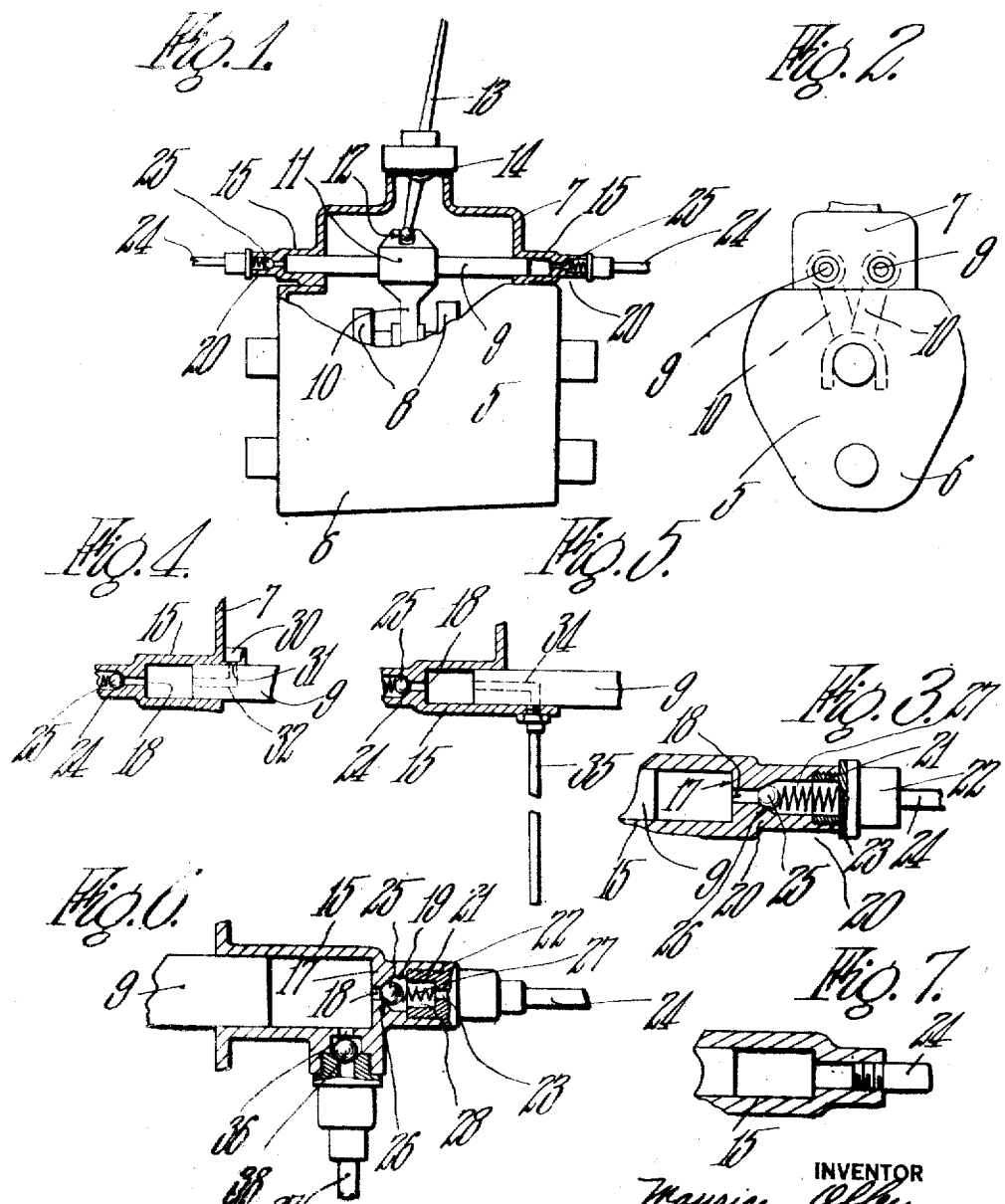

1,438,393

UNITED STATES PATENT OFFICE.

MAURICE OLLEY, OF SPRINGFIELD, MASSACHUSETTS.

CHASSIS LUBRICATION.

Application filed March 23, 1922. Serial No. 546,130.

*To all whom it may concern:*

Be it known that I, MAURICE OLLEY, a subject of the King of Great Britain, residing at Springfield, in the county of Hampden and State of Massachusetts, have invented new and useful Improvements in Chassis Lubrication, of which the following is a specification.

This invention relates to improvements in chassis lubrication and more particularly to improved means for forcing oil or grease from a common source of supply to numerous parts associated with the chassis of a motor vehicle, such as the spring shackles, the steering pivots, the steering control joints, the torque tube sphere, or other parts requiring effective lubrication.

Most of the devices which have been employed heretofore for distributing lubricant to the above named parts of the chassis comprise a conveniently located oil reservoir which is connected by a system of pipes with the various parts to be lubricated, and which is provided with a pump or similar means adapted to be operated by hand to force oil from the reservoir through the pipes to said parts. In such devices the manual operation of the pump is not associated with the general operation of driving the car and consequently is liable to be neglected.

One of the objects of the present invention is to provide improved means for automatically forcing lubricant to various parts of the chassis whereby such lubrication is accomplished as the inevitable result of manual operations necessarily performed at more or less frequent intervals for the purpose of driving the car under normal road conditions.

Another object of the invention is to provide certain new and useful improvements tending to simplify the construction and mode of operation of chassis lubricating devices.

To the accomplishment of these and such other objects as may hereinafter appear, the invention consists in the features of construction and in the combinations and arrangements of parts hereinafter described and claimed, the advantages of which will be apparent to those skilled in the art.

In the accompanying drawings,—

Fig. 1 is a view, partially in longitudinal section and partially in side elevation, of the transmission casing of a motor vehicle illustrating in connection therewith one embodiment of the present invention;

Fig. 2 is an end elevational view of the transmission casing shown in Fig. 1;

Fig. 3 is an enlarged sectional view illustrative of certain features of the present invention;

Figs. 4, 5, and 6 are detail sectional views illustrative of certain alternative forms of construction hereinafter referred to, and Fig. 7 is a view similar to Fig. 3 showing an alternative construction.

Referring to the drawings, the transmission casing of an automobile is indicated at 5. The casing 5, which comprises a main or body portion 6 and a cap 7, encloses the usual sliding variable speed gears, two of which are indicated at 8, and is provided with two slidable selector rods 9 carrying the usual forks 10 for sliding the gears into mesh. The forks 10 are rigidly secured to the slidable rods 9 and the hubs 11 of the forks are notched at their upper sides, as indicated at 12 to be selectively engaged by the lower extremity of the usual change speed lever 13 which has a ball and socket mounting in the cap 7 of the transmission casing. By shifting the change speed lever 13 into operative engagement with one or the other of the hubs 11, the rods 9 and the forks 10 carried thereby may be selectively actuated to shift the gears. The opposite ends of the selector rods 9 slide in bearings 15 in the cap 7.

In one form of construction heretofore employed the bearings for the selector rods were closed at their outer ends to prevent outward leakage of oil. With this construction as a rod was shifted in one direction, oil which adhered to the exposed portion of the rod was drawn by suction into the pocket formed between one end of the rod and the closed outer end of the respective bearing and as the rod was shifted in the opposite direction this oil was necessarily displaced and forced backwardly into the gear casing.

In accordance with the present invention, it is proposed to take advantage of this pumping action of the selector rods in their bearings to force oil from these bearings and deliver it to the various parts to be lubricated. For this purpose the outer end of each bearing 15 is closed except for an outlet port which is connected by a small tube with one of the parts to be lubricated and suitable check valves are provided for preventing a return flow of oil through these tubes, the valves being arranged to open when the selector rods are projected into the bearings and to close when the rods are withdrawn therefrom, and the rods having a sufficiently close fit within their bearing to insure an effective pumping of the oil.

Referring to Figs. 1 and 3, each selector rod bearing 15 is provided at its outer end with a wall 17 having an outlet port 18 communicating with a valve chamber 19 formed within an axial extension 20 of the bearing 15. The extension 20 is internally screw-threaded to receive the externally threaded portion 21 of a cap 22 which closes the valve chamber 19 and is provided with a central outlet passage 23 leading to a tube 24 that is suitably connected to the cap. The valve chamber 19 is provided with a ball valve 25 for closing the port 18. Normally the valve 25 is held to its seat 26 adjacent the port 18 by an expansion spring 27 which is interposed between the valve and the base of a countersunk recess 28 in the cap 22. The tube 24 leads to one of the parts of the chassis which is to be lubricated.

When the motor vehicle is being driven, a considerable quantity of oil adheres to the selector rods 9. When a selector rod is shifted one end thereof will be partially withdrawn from its bearing 15 and the suction thereby produced in the bearing pocket behind the end of the rod will draw a supply of oil from the exposed surface of the selector rod into the bearing pocket. When the rod is shifted in the opposite direction the valve 25 will be opened and the oil in the bearing pocket will be forced through the port 18, the valve chamber 19 and the respective tube 24 to the part to be lubricated.

Other methods may be employed for introducing oil into the bearing pockets in which the selector rods reciprocate. For example, it may be desirable to introduce a measured quantity of oil into the reservoir pockets each time the ends of the selector rods are withdrawn from the respective bearing pockets. This may be accomplished by providing a reservoir 30 (Fig. 4) for supplying each bearing pocket. As shown, the reservoirs 30 may be formed integrally with the cap 7 just above the inner ends of the bearings 15. The top of the reservoir is open and the oil which is continuously being splashed around in the transmission casing when the car is running will keep the reservoir filled. The bottom of the oil reservoir is provided with a small opening 31 which is adapted to register with one end of an oil passage 32 that extends from a point in the upper side of the selector rod to the adjacent end face thereof. The end of the oil passage 32 which lies in the side of the selector rod is so located with respect to the adjacent end of the rod that when the latter is at a certain position in its stroke such as the central or neutral position or the extreme outward position, said end of the oil passage will register with the opening 31 in the oil reservoir 30, permitting oil to flow from the reservoir through the passage 32 into the bearing pocket. When the selector rod is moved in the opposite direction the check valve 25 hereinbefore described will open permitting the oil to enter the conduit 24.

Alternatively, the bearing pockets may be supplied with oil as illustrated by Fig. 5. As therein shown the end of the selector rod 9 which projects into the bearing 15 may be provided with an oil passage 34 leading from the end face of the rod to a point in its lower side said point being so positioned that when the rod reaches a neutral position in its stroke the passage 34 will be in communication with the upper end of an oil conduit 35 which is threaded into the lower side of the bearing 15. The conduit 35 may extend to the bottom of the transmission casing to draw its supply of oil therefrom or it may extend to an external reservoir (not shown). If desired the end of the oil passage 34 which lies in the side of the selector rod may be so positioned therein that it will register with the supply conduit 35 when the rod reaches the outward limit of its stroke. When the oil passage 34 is brought into communication with the conduit 35 the partial vacuum produced in the bearing pocket by the movement of the rod will draw a supply of oil through the conduit 35 into said pocket and when the rod is moved in the opposite direction the valve 25 will open and the oil will be forced from the pocket through the tube 24.

Fig. 6 is illustrative of a further modified construction for effecting the introduction of oil into the bearing pockets at the end of the selector rods. As shown in Fig. 6, the pocket within the bearing 15 is connected with the conduit 24 through an outlet port 18 leading to a valve chamber 19, said port being controlled by a ball valve 25, these and the various other elements of the valve connection with the conduit 24 being of the same construction and designated by the same reference numerals as in Fig. 3. In this construction, however, the pocket within the bearing 15 is also connected through a lateral opening 36 with a conduit 37 leading to the main body of oil in the lower part of the transmission casing or to an external oil reservoir. A ball valve 38 or other suitable type of check valve may be employed which will open to permit oil to enter said pocket through the opening 36 and will close to prevent the return of oil into the conduit 37. Thus when the selector rod moves outwardly in the bearing pocket, the valve 25 will close and the valve 38 will open to permit oil to be drawn into the bearing pocket by suction and when the selector rod is moved in the oppposite direction the valve 38 will be closed and the valve 25 will open to permit the oil to be forced from the bearing pocket into the tube 24 which conveys it to the part to be lubricated.

It may be found desirable to modify the construction shown in Fig. 3 by eliminating the ball valve, the connection between the oil pocket in the bearing 15 and the oil conduit or tube 24 being made as shown in Fig. 7 by threading said tube into the outer end of said bearing. Without the valve, there will be no suction action tending to draw oil into the bearing but a certain amount of oil will work along the bearing and into the oil pocket, as the selector rod is repeatedly shifted, and this oil will be displaced from the oil pocket into the conduit connected therewith and it will gradually travel through the conduit to the part to be lubricated. It has been found in many instances that an excessive quantity of oil is supplied to the parts when the valve construction is employed and that an ample supply may be delivered without the use of any valves.

The above described device may be constructed and arranged to deliver the proper quantity of oil for ordinary lubrication of the different parts of the chassis. Considerable pressure can be produced if necessary without making the gear change appreciably more difficult. The operation is inevitable and automatic and cannot be neglected if the car is to be operated at all.

To the end that the required quantity of oil shall be delivered to the various parts of the chassis the connections to the several bearing pockets should be justly apportioned in order that the movements most frequently made on the change speed lever will force oil to those parts of the chassis which require the greatest amount of lubrication. For example, on cars which habitually start on second gear, first being rarely used, the part lubricated by the movement into first speed would have to be of secondary importance or requiring oil only in the wintertime when first speed has often to be used. The motion into reverse gear being needed with considerable frequency, would be arranged to lubricate a part of greater importance, while the movemnets into second, third and high gear being used most frequently of all, would be used to lubricate parts of the first importance.

By using branch tubes leading from the main supply conduits 24 or by distributing oil from the valve chambers 19 by means of a suitable number of tubes leading directly therefrom, the whole of the chassis could be automatically lubricated in the above described manner. It will be desirable, however, to have a transmission case having a considerable reserve supply of oil and to have oil gauge on the case which can easily be read so that it may be replenished when necessary. On cars in which the transmission is lubricated from the same body of oil as the engine, this precaution will not be necessary, since the crankchamber of the engine contains a large reserve of oil and generally a sight feed indicator showing the quantity of oil in the crankchamber.

The invention has been disclosed herein for illustrative purposes in what is at present considered its preferred embodiment and several modified constructions have also been referred to, but it is to be understood that the scope of the invention is defined by the appended claims rather than by the foregoing description. It is particularly pointed out that while the invention has been illustrated and described in connection with an automobile transmission of the selective sliding gear type it is equally applicable for use in connection with transmissions of the progressive sliding gear type or of the planetary type inasmuch as both these latter types commonly comprise one or more slidable shafts which may be utilized to produce the requisite pumping action for supplying the oil. The invention is not, in fact, limited to the employment of a slidable transmission shaft as the piston and said shaft bearing as the cylinder of the oil pump, it being within the scope of the invention to employ an oil pump of any type which may be operatively connected with the change speed lever or other reciprocable part of an automobile transmission.

The invention having been described, what is claimed is:

1. In a motor vehicle the combination with the change speed lever, of an oil pump adapted to be operated by movement of said lever, means for supplying oil to the pump, and a conduit for conveying oil from the pump to a remote part of the vehicle.

2. In a motor vehicle the combination with the variable speed transmission mechanism and means for shifting said mechanism for changes of speed, of means operated by the shifting of said mechanism for delivering a supply of lubricant to a part of the vehicle removed from said mechanism.

3. In a motor vehicle, in combination, variable speed transmission mechanism, a casing therefor adapted to contain a supply of lubricant, means for shifting said mechanism for changes of speed, and means operated by the shifting of said mechanism for delivering a supply of lubricant from said casing to a part of the vehicle remote therefrom.

4. In a motor vehicle the combination with a variable speed transmission comprising sliding gears, a slidable rod connected with said gears for shifting the same, and means for holding a supply of lubricant, of means operating upon an actuation of said rod for delivering lubricant from said supply to a part of the vehicle remote therefrom.

5. In a motor vehicle the combination with a variable speed transmission comprising sliding gears, a slidable rod, and connections between said rod and the transmission gears for shifting the latter into and out of mesh, and a bearing for one end of said rod, of means for closing said bearing at its outer end to provide a pocket for holding lubricant, and means for introducing lubricant into said pocket when said rod is moved in one direction and for delivering lubricant from said pocket to a part of the vehicle remote therefrom when said rod is moved in the opposite direction.

6. In a motor vehicle the combination with a variable speed transmission comprising slidable gears and a slidable rod for shifting the same, of a pocket for holding a supply of lubricant, and a conduit leading from said pocket to a part to be lubricated, said pocket being constructed and arranged to serve as a pump cylinder with which said rod cooperates as a piston to force lubricant from said pocket through said conduit.

7. In a motor vehicle the combination with a variable speed transmission comprising slidable gears, and a slidable rod connected with said gears for shifting the same, of a pocket for holding a supply of lubricant, a conduit leading from said pocket to a part to be lubricated, said pocket being constructed and arranged to serve as a pump cylinder with which said rod cooperates as a piston to force lubricant from said pocket through said conduit, and means for replenishing the supply of lubricant in said pocket.

8. In a motor vehicle, the combination with variable speed transmission comprising sliding gears, a casing for the transmission gearing adapted to hold a supply of lubricating oil, a slidable rod, and devices on said rod for shifting said slidable gears into and out of mesh, of bearings in the casing for said rod one of said bearings being closed at its outer end to form a pump cylinder into which said rod projects and with which it is adapted to cooperate as a pump piston to draw oil from the interior of the casing into said cylinder and to discharge oil from the cylinder, and a conduit for receiving the oil discharged from the pump cylinder and conveying it to a part to be lubricated.

9. In a motor vehicle the combination with variable speed transmission comprising slidable gears, a casing for the transmission gearing adapted to hold a supply of lubricating oil, a slidable rod and devices on said rod for shifting said gears into and out of mesh, of bearings in the casing for said rod one of said bearings being closed at its outer end to form a pocket into which oil is drawn from the interior of the said casing when the selector rod is shifted in one direction, a conduit leading from said pocket to a part of the vehicle to be lubricated, and a check valve for preventing the return of the oil into said pocket.

10. In a motor vehicle the combination with variable speed transmission comprising sliding gears, a casing for the transmission gearing adapted to hold a supply of lubricating oil, a slidable rod, and devices on said rod for shifting the gears into and out of mesh, of bearings in the casing for the opposite ends of said rod, said bearings being adapted to serve as pump cylinders into which oil is drawn from the interior of said casing as the ends of said rod are retracted from said bearings and from which oil is forced as the ends of said rod are projected into said bearings, conduits leading from said bearings to conduct oil to parts of the vehicle remote therefrom, and check valves for preventing the return of oil through said conduits.

11. In a motor vehicle the combination of variable speed transmission gears, a casing for said gears adapted to hold a supply of lubricating oil, a horizontal sliding rod having an oil passage extending from one end face to a point in the side thereof, devices on said rod for shifting the gears into and out of mesh, bearings in the casing for said rod one of said bearings being closed at its outer end to form a pump cylinder with which said rod cooperates as a piston, a conduit leading from said bearing to a part of the vehicle to be lubricated, a check valve for preventing the return of the oil into said pocket, and an oil reservoir adjacent said bearing in the interior of said casing said reservoir having an outlet orifice in its under side adapted to register with the end of said oil passage in the side of said rod at one point in the stroke of the latter to enable oil to be drawn by suction from said reservoir to said pump cylinder.

12. In a motor vehicle, in combination, variable speed transmission mechanism, means for shifting said mechanism for changes of speed comprising a slidable rod, a pocket for holding a supply of lubricant, a conduit leading from said pocket to a remote part of the vehicle to be lubricated, said pocket being constructed and arranged to serve as a pump cylinder with which said rod cooperates as a piston to force lubricant through said conduit.

In testimony whereof I have affixed my signature.

MAURICE OLLEY.